(12) United States Patent
Filonczuk et al.

(10) Patent No.: US 7,578,331 B2
(45) Date of Patent: Aug. 25, 2009

(54) MACHINE FOR PRECISELY DELIVERING AND AFFIXING SOLID MEDIA FOR THE PURPOSE OF CREATING PROTOTYPES OF VARYING SIZE AND PRECISION

(76) Inventors: Michael Arthur Filonczuk, 5732 Oakdale Ave., Woodland Hills, CA (US) 91367; Raymond James Claridge, 12580 Saticoy St., North Hollywood, CA (US) 91605

( * ) Notice: Subject to any disclaimer, the term of this patent is extended or adjusted under 35 U.S.C. 154(b) by 680 days.

(21) Appl. No.: 11/306,509

(22) Filed: Dec. 30, 2005

(65) Prior Publication Data

US 2007/0151671 A1    Jul. 5, 2007

(51) Int. Cl.
*B32B 41/00* (2006.01)
*B32B 37/12* (2006.01)

(52) U.S. Cl. .................. 156/355; 156/353; 156/356; 156/357; 156/367

(58) Field of Classification Search .................. 156/353, 156/354, 356, 357, 366, 367, 368; 364/113, 364/497; 264/113, 497
See application file for complete search history.

(56) References Cited

U.S. PATENT DOCUMENTS 4,575,330 A     3/1986  Hull
7,093,638 B2 *  8/2006  Bonaventura ............... 156/351

* cited by examiner

*Primary Examiner*—George R Koch, III

(57) ABSTRACT

A machine for precisely delivering and affixing solid media for the purpose of creating prototypes of varying size and precision. The device would, with great precision, deliver uniform shaped media, of any size, made of plastic, carbon fiber, metal or other solid or hollow materials to a position precisely determined by a computer. Adhesive will be applied to each piece of media and an adhesive accelerant will be applied to the position the media is to be placed so that when the media contacts the prior placed media with adhesive accelerant applied, it will adhere fast. In this manner multiple pieces of uniform media can be adhered in an ever increasing number precisely positioned as determined by computer software and the computer controlled apparatus. Objects and prototypical shapes can then be created by the combination and adhesion of all the media parts.

14 Claims, 2 Drawing Sheets

MACHINE FOR PRECISELY DELIVERING AND AFFIXING SOLID MEDIA FOR THE PURPOSE OF CREATING PROTOTYPES OF VARYING SIZE AND PRECISION

BACKGROUND OF THE INVENTION

This invention relates generally to the field of rapid prototyping and more specifically to a machine for precisely delivering and affixing solid media for the purpose of creating prototypes of varying size and precision.

There has always been a need to model inventions, machines or structures to allow people the ability to visualize their design in three dimensions that was just flat on paper or sketched. Modeling and machining of these visions became time consuming and greatly added to time it took to create a product and deliver it to the marketplace. With the invention of computer aided drawing and eventually 3-D modeling, people could see their design on the computer screen in 3-D. To get from this design point to a physical prototype still took machining and modelers and more importantly time.

With the advent of computer controlled printing using liquid inks sprayed or bubbled onto a paper came the notion that the same device could be used to "print" 3-D objects. Several methods were developed to create 3-D objects from powder, liquid or hot plastic. All the devices used a build platform that could be raised or lowered as each layer of the object designed in CAD (Computer Aided Drawing) was hardened or glued. Multiple layers then were added and the 3-D object would appear in the liquid, powder or on the build platform. These objects could then, on a small scale be used to test color, fit and design characteristics. The prototypes are relatively cheap and can be produced quite fast but are extremely limited in size. Thus the rapid prototyping industry emerged.

In contrast, however, the auto industry and aircraft industry would build prototypes of wood or clay. These large scale models could then be used to test in wind tunnels or admired and scrutinized by designers and the firm's decision makers. This process is extremely time consuming and costly.

The method of computer printing using liquid inks sprayed or bubbled onto a paper was amended to a new process that would "print" 3-D objects using an adhesive bubbled onto a build platform covered in powder. The adhesive would glue the powder together in the precise shape described in a 3-D CAD drawing. The build platform could then be dropped down to allow the next microscopic layer to be "printed." In this manner, layer after layer of adhered powder could be laid down to eventually create, on a small scale, a 3-d solid object "print" made up of layers of glued powder. Excess powder would then be removed and the 3-D object would be apparent. This technology is limited to a size of approximately 12"×12"×18". Objects "printed" could then be used as prototypes to test materials, size, fit, and color without going through the expensive and time consuming process of molding individual pieces, machining or carving.

Further technology involves the use of laser scintering which utilizes a pool of laser activated liquid resin that can be turned to solid by the precise aim of a laser on a submerged build platform. As the laser changes liquid resin to solid, the platform moves to create layers and thus 3-D objects rise from the liquid and are used in the same manner as described above but are less strong and precise.

Another similar technology evolved that bubbled microscopic hot plastic to the build platform. Layer after layer of hot liquid plastic dots was laid down, thus creating the 3-d object. These plastic models are much stronger, and in some cases can be used for pressure testing as well as fit and design testing.

The types of rapid prototypers described above cannot be applied to larger objects such as automobiles or aircraft. Currently, autos are designed on CAD programs and the design is fed into programs controlling large multi-axis CNC milling machines. These machines carve large blocks of foam or clay coated foam to create the shape of the vehicle or aircraft envisioned by the designer. The prototype can then be tested for shape, color, wind resistance and flow much as the above pieces, except on a larger scale. No interior spaces are created in this process, however.

In the three rapid prototyping methods described above, powder adhesion, laser scintering and plastic deposition, there is a major deficiency that all three have in common: size. Size matters, especially in certain industries where large items are created. The aforementioned rapid prototypers are limited to 12"×12"×18". Sometimes the objects can be glued together to create a larger object but then the new object lacks precision and strength.

In the auto and aircraft industry, large multi-axis machines machine large shapes from foam or clay covered foam. These prototypes are only good for visually inspecting and testing the exterior of the vehicle as the interior of the vehicle cannot be modeled or shaped due to access of the large machine, also lower portions and the underneath of the car is not prototypeable with this method.

The device according to the present invention was expressly designed to solve the prototype size problem. The new device teaches building prototypes by gluing spheres of any diameter from BB size to say basketball size to each other in a carefully computer designed array as to represent a 3-D CAD drawing. The device according to the present invention can build prototypes much larger than the prior art. The preferred embodiment would utilize media balls of a diameter determined by the size of the prototype to be built and the quality of "print" needed. As an example, for smaller prototypes of the size of say a car engine, smaller bb size metal balls might be used to not only "print" the shape, but may be approximate the weight also. The smaller the media, the better the quality of the "print", much as a 'dots per inch' determines the quality of print materials. Furthermore, the device according to the present invention can "print" full size aircraft wings and fuselages that can be used immediately for preliminary wind tunnel and design testing.

Also, prior art is limited in the materials that can be utilized. Cornstarch, resin and plastic utilized by the three prototypers mentioned prior respectively, are the only materials that can be used. The device according to the present invention can utilize plastic, steel, aluminum, brass, composites, resins, clear acrylics, glass etc. Practically any material that can be output into a uniform shape can be used.

With respect to the automotive industry, the device according to the present invention, has significant advantages over prior art. First of all, vehicle prototypers can only cut exterior surfaces. The device according to the present invention can "print" the entire vehicle INSIDE AND OUT. Interior design, underneath the vehicle, engine, transmission, all can be "printed" by the processes of gluing little balls together in a precise manner. The printed prototype itself may be displayed as a promotional piece as it emerges from the prototyper almost as a piece of art. In an equally important embodiment, the device according to the present invention can use a media comprised of cylindrical cut to length pieces that will allow flat surfaces to be "printed without major voids or even cubic media with no voids. The larger the media the quicker the "print" For vehicle prototyping, larger media can be coated and sanded smooth with filler. Finished "printed" parts can be dipped in epoxy for strengthening.

The device according to the present invention, when applied to the aircraft industry prior art of molding with wood and fiberglass, has many very significant advantages. First of all, size. There is no limitation to the size of the prototype. Entire aircraft can be "printed" multiple machines can glue up an aircraft of aluminum or modern composites with all the interior voids and may even have the strength to be actual components.

The device according to the present invention can also change media size so that structural components may be built faster out of larger media while surfaces may need smaller media to be smoother and more precise.

The device according to the present invention saves labor, as the machines can 'print' at night and weekends with little supervision.

In a further embodiment, entire buildings and houses can be "printed" out of say, ping pong balls, glued around plumbing and conduit runs, coated with plaster and stucco and occupied immediately. Air space in the ping pong balls would provide insulation and the spherical shape would provide excellent strength.

In conclusion, the device according to the present invention is a vast improvement over present powder, laser scintering and hot plastic prototypers because of the device according to the present invention's ability to "print" prototypes of large size and strength of varying materials. Furthermore, with respect to the automotive industry, the device according to the present invention can "print" interior spaces and entire vehicles including the underneath. Also, the device according to the present invention, with respect to the aircraft industry can create full size aircraft, work at off hours, and print parts that may be structurally useful. Finally, the device according to the present invention, can "print" designs and parts the size and shape like no other prototyper. Entire houses and buildings or large mechanical prototypes are possible with a mixture of media sizes and types.

BRIEF SUMMARY OF THE INVENTION

The primary object of the invention is to provide rapid prototyping on a larger scale than is currently available.

Another object of the invention is to provide large prototypes that are ready for full size fit, wind, and other testing.

Another object of the invention is to provide large prototypes in a short amount of time and for less cost.

A further object of the invention is to provide prototypes that have interior spaces and structural components.

Yet another object of the invention is to provide prototypes that are of materials not available to current rapid prototypers.

Still yet another object of the invention is to provide full size prototypes for promotional display or as art.

Another object is to provide prototypes with insulating structure.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for precisely delivering and affixing solid media for the purpose of creating prototypes of varying size and precision. The device comprising: A media supply tube to supply different media to be precisely placed and affixed, A media control means to precisely control the rate of media delivery, A precision stepper motor to control said media control means, An adhesive dispersal ring to coat said media with adhesive, An adhesive injector to control the amount of adhesive distributed to said adhesive dispersal ring, A media retainer to retain said media until the device is in precise position to place and adhere said media, An adhesive accelerator tube to apply adhesive accelerator to the prior adhered said media before the next media is affixed, An Adhesive accelerator injector to control the supply of said adhesive accelerator to said adhesive accelerator tube, A computer controlled multi axis CNC machine to precisely control the positioning of the device when said media coated with said adhesive emerges form said media retainer and is precisely affixed, and Software to precisely control said computer controlled multi axis machine, said stepper motor, said adhesive injector, said media retainer, and said adhesive accelerator injector.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Uniform Media is loaded into a Media Supply 10, which supplies media to the Media Tube 11, the flow of the media is controlled by the Media Control Wheel 15 powered by Stepper Motor 18, which moves media past an Adhesive Dispersal Ring 16 where it is coated with adhesive supplied by Adhesive Injector 13, the media is retained by Media Retainer 17 as an adhesive accelerant is applied, by the Adhesive Accelerator Injector 12, to the spot where the new media is to be affixed. All components are controlled by Computer 14 and it's software and the device is attached to multi axis CNC machine by Attachment Means 19.

Figure 200:
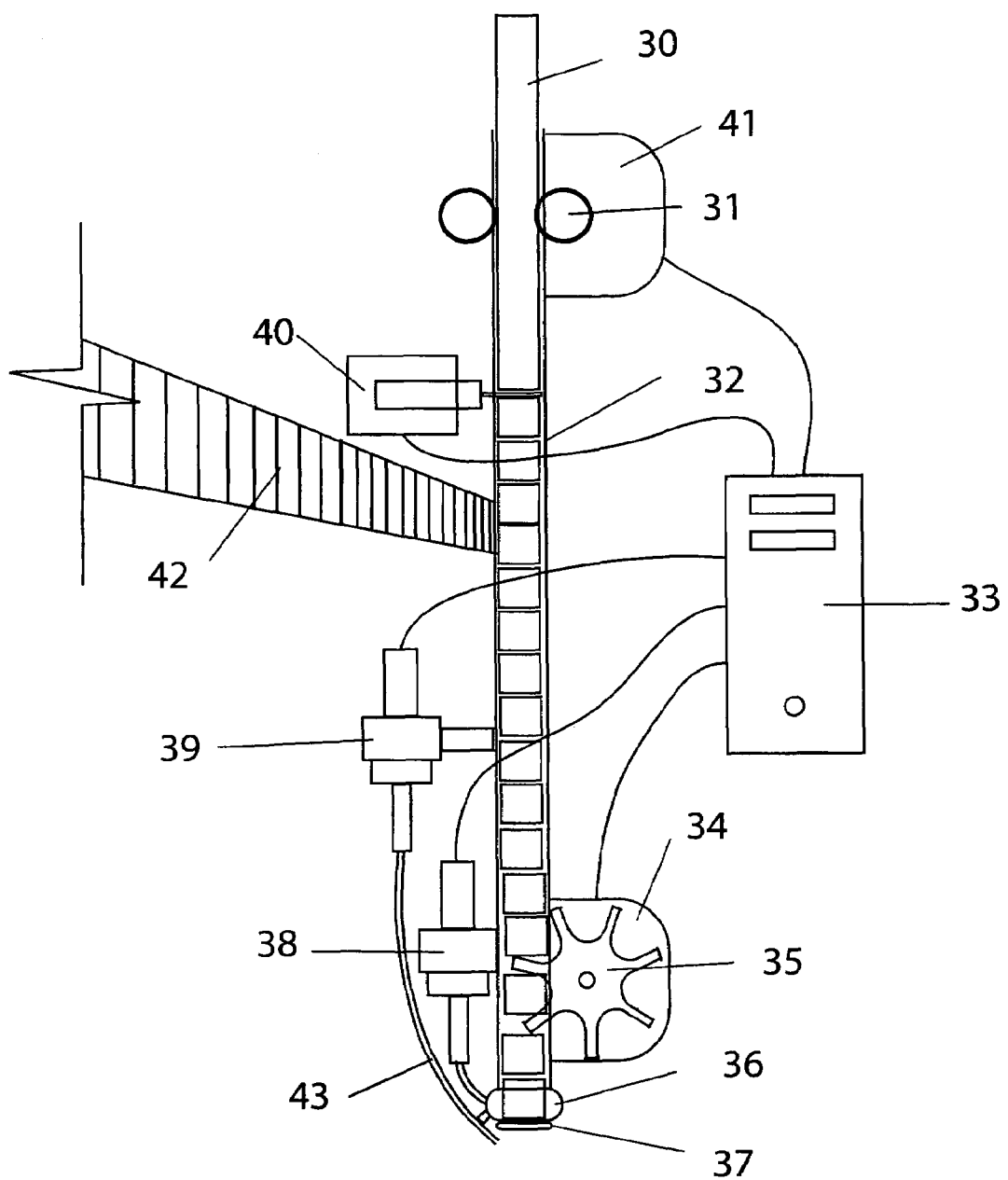

FIG. 200 is an elevational view of an additional embodiment of the invention.

Continuous Cylindrical Media 30 is inserted into Media Supply Tube 32 and fed down the tube by Media Supply Control 31 powered by Stepper Motor 41 which feeds media past Media Cutter 40 which cuts the media to length as media passes down to Media Control Wheel 35, powered by Stepper Motor 34, which moves media past an Adhesive Dispersal Ring 36 where it is coated with adhesive supplied by Adhesive Injector 38, the media is retained by Media Retainer 37 as an adhesive accelerant is applied, by the Adhesive Accelerator Injector 39, to the spot where the new media is to be affixed. All components are controlled by Computer 33 and its software and the device is attached to multi axis CNC machine by Attachment Means 42.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 100:
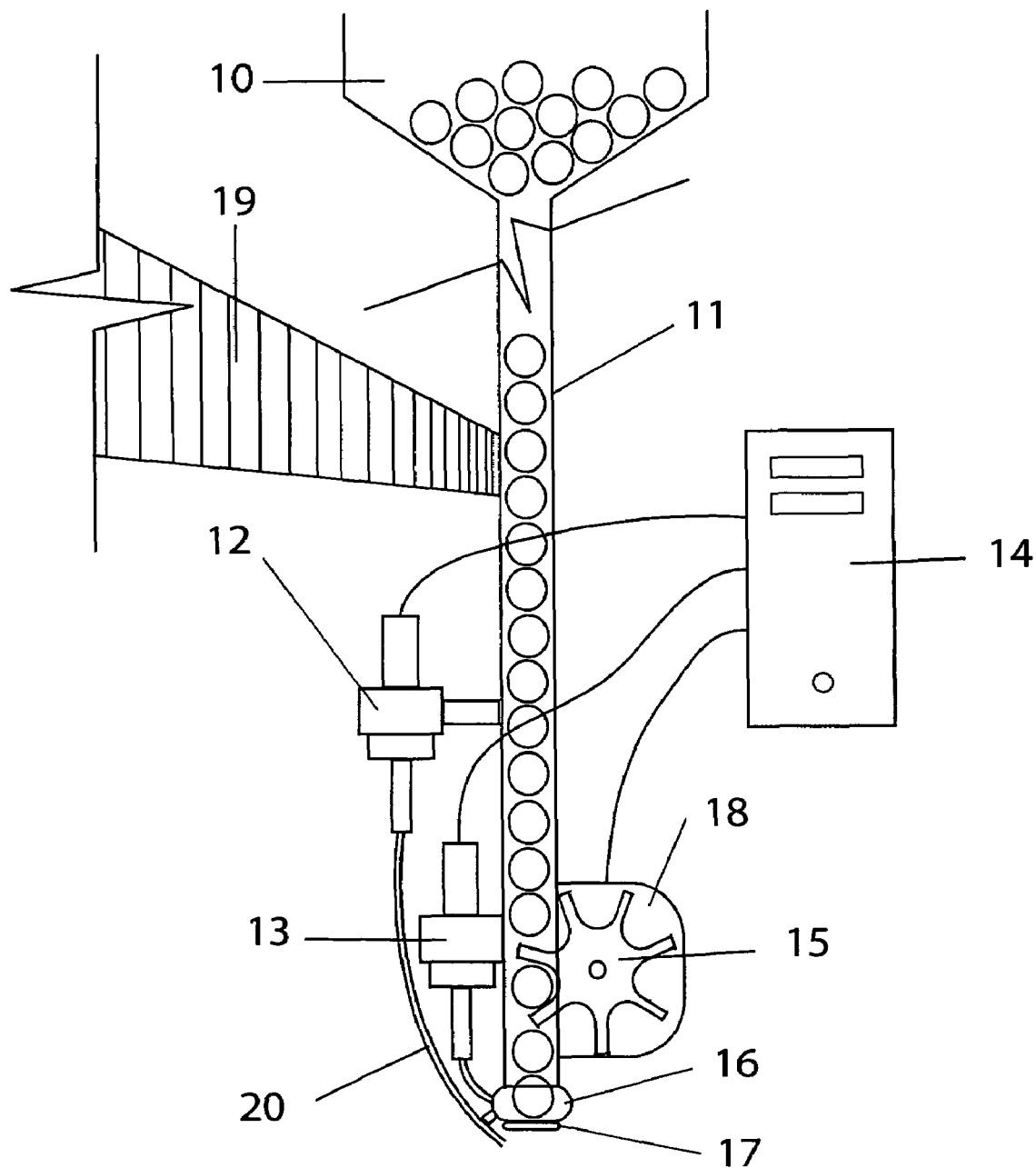
FIG. 100 is an elevational view of the invention.

In accordance with the present invention, there is shown in FIG. 100 a machine for precisely delivering and affixing solid media for the purpose of creating prototypes of varying size and precision. Described in FIG. 200 is a variation of the device that utilizes continuously solid cylindrical media.

Looking at FIG. 100, we see a Media Storage Means 10 represented as a hopper. This is simply a representation of any type of means to store spherical media of consistent size to allow a continuous supply of media to the device. The Media Storage Means 10 could be a drum, bucket, vat, bag or any other type of container. The Media Storage Means 10 must be of sufficient capacity to keep the device operating constantly without the need to refill often. The Media Storage Means 10 also needs to have an opening to allow the unrestricted flow of media into the Media Supply Tube 11. The Media Supply Tube 11 is a conveyance means to get media from the storage means to the Media Control Means 15. The Media Supply Tube 11 must be of a diameter larger than the selected media to allow free flow of media along its length. Media may be selected of any diameter and therefore the Media Supply Tube 11 must be available in varying diameters or be easily interchanged. The Media Control Means 15 can be a wheel, chain, conveyor belt, cog, gear, or any similar means that can precisely control the rate of flow of media coming down the Media Supply Tube 11 and out to pass through the Adhesive Dispersal Ring 16. The operation of the Media Control Means 15 is powered by the Stepper Motor 18 familiar to anyone schooled in the mechanical and robotic arts. It is taught that media then can be coated with an adhesive as it passes through the Adhesive Dispersal Ring 16 and retained by the Media Retainer 17 before being pushed out at the precise moment necessary as controlled by the Media Control Means 15. The Adhesive Dispersal Ring 16 can coat the media with adhesive by various means, spray, roller, brush etc. The Media Retainer 17 may be any means that can hold the media until the precise moment it needs to be ejected into position. Rollers, springs, air powered jaws, pins or even magnetic means may be used depending on media size and material. It is further taught that the adhesive passes into the Adhesive Dispersal Ring 16 as delivered from an Adhesive Injector 13. The Adhesive Injector 13 can be any means to deliver a precise amount of adhesive at a precise time to the Adhesive Dispersal Ring 16. An electronic injector of the automotive type, or a common pump or solenoid operated valve can be used to deliver and control adhesive. The present invention is also concerned with applying an adhesive accelerator to the area where the media is about to be affixed. This is accomplished by an Adhesive Accelerator Injector 12 that controls the precise amount of adhesive accelerant delivered. The adhesive accelerant can also be spread by a spray means, roller, brush or whatever means is most effective. The device pictured in FIG. 100 relies on a spray means with accelerant sprayed from an Accelerant Tube 20. The entire assembly pictured in FIG. 100 is mounted on a multi axis CNC mill type machine by Mounting Means 19. The combination of CNC machine, computer and software teaches the movement and precise positioning of the device in FIG. 100 is crucial to the operation of the device. Any type and size of CNC milling machine may be utilized as long as the position of the assembly can be precisely determined, controlled and monitored by machine software. The CNC machine must be of sufficient size to accommodate the size of the target prototype to be built. The synchronization, timing and operation of the components of the device according to the present invention are all precisely controlled by a computer and inherent software designed specifically for the purpose of affixing media in an exact position.

FIG. 200 describes an alternate embodiment of the present invention. The significant difference between FIG. 100 and FIG. 200 is the difference in the type of media utilized. The device according to FIG. 100 utilizes uniformly spherical media of almost any diameter while the device described in FIG. 200 utilizes media of a solid cylindrical type of almost any diameter and a Media Cutter 40 to cut the cylindrical media to length as well as a Media Supply Control 31 controlled by Stepper Motor 41. Cylindrical media is supplied down Media Supply Tube 32 by Media Control Means 31. The Media Control Means 31 may be rollers, gears, wheels, or any other means that can hold and move the cylindrical media into position in the Media Cutter 40. The Media Cutter 40 can be any solenoid, air or electrically operated device such that when activated will precisely cut the cylindrical media into slices from thin wafers to longer columns. After the cylindrical media is cut to the desired length as determined by the software and the requirement of the object to be prototyped, the cut cylindrical media moves down Media Supply Tube 32 where the cut cylindrical media movement is controlled by Media Control 35, powered by Stepper Motor 34. The Media Control 35 can be a wheel, cog, gear, chain, or conveyor or any other means that will be able to readily adjust to the changing lengths of cut cylindrical media and still control movement of the cut cylindrical media along the Media Supply Tube 32. The cut cylindrical media then moves to the Adhesive Dispersal Ring 36 where it is coated with adhesive by an appropriate means: roller, spray, brush etc. The amount and timing of the adhesive application is controlled by the Adhesive Injector 38. The cut cylindrical media, now adhesive coated, proceeds to the Media Retainer 37 where it is arrested until the precise moment it is pushed from Media Retainer Ring 37 and into a precise desired position. Prior to the placement of the cut cylindrical media, an adhesive accelerant is applied to the position to where the cut cylindrical media is to be precisely placed. The timing and amount of adhesive accelerator is controlled by the Accelerator Injector 39 as it is dispersed through Adhesive Accelerator Tube 43. The device mounted to the CNC mill by Mounting Means 42 teaches the movement and precise positioning is crucial to the operation of the device. Any type and size of CNC multi axis milling machine may be utilized as long as the position of the assembly can be precisely determined, controlled and monitored by machine software. The CNC machine must be of sufficient size to accommodate the size of the target prototype to be built. The synchronization, timing and operation of the components of the device according to the present invention are all precisely controlled by a computer and inherent software designed specifically for the purpose of affixing media in an exact position.

The operation of the device according to the present invention pictured in FIG. 100 is described below. First, a CAD designer must render the proposed prototype in a 3-D Computer Aided Drawing (CAD) program. The designer then selects the print output on his program command and selects the prototyper described as the present invention as his desired printer to "print" the design as a solid 3-D object. The designer then would also select the type and size media listed under printer preferences. The device according to the present invention along with the written software would then check to make sure the parameters (size of media, type, material, color etc) of the project as selected by the designer are available, as any printer, and then begin the "print." The device according to the present invention would then select the appropriate media supply, material type and diameter of media to be used as well as adhesive and accelerant and set up the machine accordingly. Media would then flow down the Media Supply Tube 11; the media movement controlled by Media Control Means 15 and Stepper Motor 14. Media would then be coated with adhesive supplied by the Adhesive Injector 13 as it passes through the Adhesive Dispersal Ring 16 and the media travel is arrested momentarily by the Media Retainer 17. The multi axis CNC machine would then position the device according to the present invention in an exact position determined by the design software, CNC software and the 3-D design itself. A space or build platform of appropriate size, in close proximity to the CNC machine would be made available to accommodate the new "printed" prototype. The device according to the present invention would then apply a small amount of adhesive accelerant to the spot where the first media sphere is to be precisely placed and attached by means of the Adhesive Accelerator Injector 12 and Adhesive Accelerator Tube 20. The Media Retainer 17 would then release and the adhesive coated spherical media would emerge from the device according to the present invention and be instantly affixed to the build platform as the adhesive and adhesive accelerant react. The CNC machine would then reposition for the next adhesive coated media to be placed and affixed in position. As each media is affixed according to the 3-D design, software, and CNC positioning, a prototype of the design will take shape until the entire prototype is "printed" as a 3-d object of any scale. The quality of the "print" is determined by the media selected. The smaller the media, the better the "print." Further, the device according to the present invention can affix media that is soluble, as support structures and allow for interior voids in the "print" which can later be dissolved.

The operation of the device according to the present invention pictured in FIG. 200 is described below. First, a CAD designer must render the proposed prototype in a 3-D Computer Aided Drawing (CAD) program. The designer then selects the print output on his program command and selects the prototyper described as the present invention as his desired printer to "print" the design as a solid 3-D object. The designer then would also select the type and size media listed under printer preferences. The device according to the present invention along with the written software would then check to make sure the parameters (size of media, type, material, color etc) of the project as selected by the designer are available, as any printer, and then begin the "print." The device according to the present invention would then select the appropriate media supply, material type and diameter of media to be used as well as adhesive and accelerant and set up the machine accordingly. Solid cylindrical Media would then move down the Media Supply Tube 32, the media movement controlled by Media Control Means 31 and Stepper Motor 41. The solid cylindrical media would move into Media Cutter 40, and be cut to the appropriate length as determined by the software and design parameters. The cut cylindrical media would then move down the Media Supply Tube 23; the movement controlled by the Media Control Means 35 and Stepper Motor 34. Cut cylindrical media would then be coated with adhesive supplied by the Adhesive Injector 38 as it passes through the Adhesive Dispersal Ring 36 and the media travel is arrested momentarily by the Media Retainer 37. The multi axis CNC machine would then position the device according to the present invention in an exact position determined by the design software, CNC software and the 3-D design itself. A space or build platform of appropriate size, in close proximity to the CNC machine would be made available to accommodate the new "printed prototype." The device according to the present invention would then apply a small amount of adhesive accelerant to the spot where the first cut cylindrical media is to be precisely placed and attached by means of the Adhesive Accelerator Injector 39 and Adhesive Accelerator Tube 43. The Media Retainer 37 would then release and the adhesive coated cut cylindrical media would emerge from the device according to the present invention and be instantly affixed to the build platform as the adhesive and adhesive accelerant react. The CNC machine would then reposition for the next adhesive coated cut cylindrical media to be placed and affixed in position. As each media is affixed according to the 3-D design, software, and CNC positioning, a prototype of the design will take shape until the entire prototype is "printed" as a 3-d object of any scale. The quality of the "print" is determined by the media selected; the smaller the media, the better the "print." Further, the device according to the present invention can affix media that is soluble as support structures and allow for interior voids in the "print" which could later be dissolved.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device machine for precisely delivering and affixing solid media for the purpose of creating prototypes of varying size and precision, comprising:
    a media supply tube to supply different media to be precisely placed and affixed;
    a media control means to precisely control a rate of media delivery;
    a precision stepper motor to control said media control means;
    an adhesive dispersal ring to coat said media with adhesive;
    an adhesive injector to control an amount of said adhesive distributed to said adhesive dispersal ring;
    a media retainer to retain said media until the device is in precise position to place and adhere said media;
    an adhesive accelerator tube to apply adhesive accelerant to the prior adhered media before a next media is affixed;
    an adhesive accelerator injector to control a supply of said adhesive accelerant to said adhesive accelerator tube; and
    a computer controlled multi axis CNC machine to precisely control positioning of the device when said media coated with said adhesive emerges from said media retainer and is precisely affixed.

2. A device for precisely delivering and affixing cut cylindrical media for the purpose of creating prototypes of varying size and precision, comprising:
    a media supply tube to supply solid cylindrical media to be cut and precisely placed and affixed;
    a media control means to precisely control a rate of said cylindrical media delivery;
    a precision stepper motor to control said media control means;
    a media cutter to cut cylindrical media to a predetermined length;
    an adhesive dispersal ring to coat said cut cylindrical media with adhesive;
    an adhesive injector to control an amount of said adhesive distributed to said adhesive dispersal ring;
    a media retainer to retain said media until the device is in a precise position to place and adhere said media;
    an adhesive accelerator tube to apply adhesive accelerant to the prior adhered media before a next media is affixed;

an adhesive accelerator injector to control a supply of said adhesive accelerant to said adhesive accelerator tube; and a computer controlled multi axis CNC machine to precisely control positioning of the device when said media coated with said adhesive emerges from said media retainer and is precisely affixed.

3. The device in accordance with claim 1, further comprising: software to precisely control said computer controlled multi axis CNC machine, said stepper motor, said adhesive injector, said media retainer, and said adhesive accelerator injector.

4. The device in accordance with claim 1, wherein said media control means is selected from the group consisting of a wheel, chain, conveyor belt, cog and gear.

5. The device in accordance with claim 1, wherein said adhesive dispersal ring coats said media with said adhesive by means selected from the group consisting of spray, roller and brush.

6. The device in accordance with claim 1, wherein said adhesive injector is selected from the group consisting of an electronic injector of the automotive type, a common pump and solenoid operated valve.

7. The device in accordance with claim 1, wherein said adhesive accelerant is delivered through means selected from the group consisting of a spray means, roller and brush.

8. The device in accordance with claim 2, further comprising: software to precisely control said computer controlled multi axis CNC machine, said stepper motor, said adhesive injector, said media retainer, and said adhesive accelerator injector.

9. The device in accordance with claim 2, wherein said media control means is selected from the group consisting of a wheel, chain, conveyor belt, cog and gear.

10. The device in accordance with claim 2, wherein said adhesive dispersal ring coats said media with said adhesive by means selected from the group consisting of spray, roller and brush.

11. The device in accordance with claim 2, wherein said adhesive injector is selected from the group consisting of an electronic injector of the automotive type, a common pump and solenoid operated valve.

12. The device in accordance with claim 2, wherein said adhesive accelerant is delivered through means selected from the group consisting of a spray means, roller and brush.

13. A device for precisely delivering and affixing solid media for the purpose of creating prototypes of varying size and precision comprising:

an adhesive injector to distribute an amount of adhesive for coating said media in an adhesive dispersal ring;

means, supplied by a tube, for precisely controlling a rate of delivering said media to be precisely placed and affixed;

means for retaining said media until the device is in a precise position to place and adhere said media means, applied by an adhesive accelerator tube, for controlling a supply of said adhesive accelerant to a first adhered media before a next media is affixed; and means, supported by computer software, for precisely controlling a position of the device when said media coated with said adhesive emerges from said means for coating and is precisely affixed.

14. A device for precisely delivering and affixing cut cylindrical media for the purpose of creating prototypes of varying size and precision comprising:

a media cutter to cut cylindrical media supplied by a tube to a predetermined length to form a first cut cylindrical media;

an adhesive injector to distribute an amount of an adhesive for coating said media in an adhesive dispersal ring;

means, supplied by a tube, for precisely controlling a rate of delivering said media to be precisely placed and affixed;

means for retaining said media until the device is in a precise position to place and adhere said media;

means, applied by an adhesive accelerator tube, for controlling a supply of said adhesive accelerant to the first adhered media before a next cut media is affixed; and means, supported by computer software, for precisely controlling a position of the device when said media coated with said adhesive emerges from said means for coating and is precisely affixed.

* * * * *